(No Model.)

A. V. MESEROLE.
GALVANIC BATTERY.

No. 386,150. Patented July 17, 1888.

Attest:
Geo. H. Bott
G. M. Borst

Inventor:
Abraham V. Meserole
by Philipp, Phelps & Hovey
Attys.

UNITED STATES PATENT OFFICE.

ABRAHAM V. MESEROLE, OF NEW YORK, N. Y.

GALVANIC BATTERY.

SPECIFICATION forming part of Letters Patent No. 386,150, dated July 17, 1888.

Application filed February 2, 1888. Serial No. 262,768. (No model.)

*To all whom it may concern:*

Be it known that I, ABRAHAM V. MESEROLE, a citizen of the United States, residing at New York, county of New York, and State of New York, have invented certain new and useful Improvements in Galvanic Batteries, fully described and represented in the following specification and the accompanying drawings, forming a part of the same.

This invention relates to that class of batteries known as "primary" or "galvanic" batteries, it being the object of the invention to increase the constancy and volume of the current produced and at the same time prolong the life of the battery.

The battery embodying the present improvements is in many respects similar to that described in my prior application for Letters Patent, filed October 28, 1887, Serial No. 253,651, and the improvements may to some extent be said to be based upon that battery.

The elements of the battery described in my said application consisted of a positive electrode of zinc, a negative electrode of copper, an exciting chlorine solution, and a depolarizing agent or material containing hydrate of copper—that is to say, an alkaline hydrate.

I have found that the effectiveness of the depolarizing agent can be increased and the life of the battery prolonged by employing a negative electrode composed of carbon, or of carbon thinly plated—as, for example, electroplated—with copper instead of an electrode wholly of copper. With a carbon electrode thinly coated with copper—as, for example, electroplated—the copper during the periods of rest becomes partly oxidized, and this action is accelerated by the presence of the more electro-negative carbon. The coating of copper is to be thin and the carbon exposed in spots or edges to facilitate the electrolytic action or oxidation. This action prolongs the life of the cell and depolarizer. With a pure copper electrode this action would not occur except in a very slight degree. I have also found that the battery is further improved by employing an alkaline-chloride solution, and in some cases a solution containing an alkaline nitrate as the exciting-fluid.

A full understanding of the invention can be best given by describing it in connection with the accompanying drawings, in which—

Figure 1:
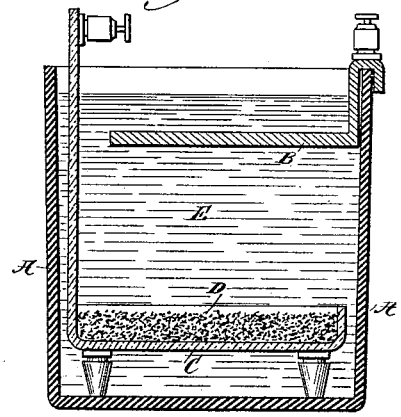
Figure 2:
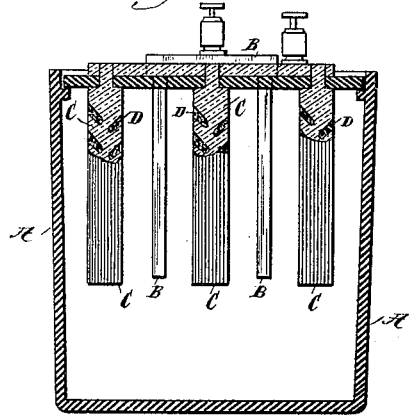
Figure 3:
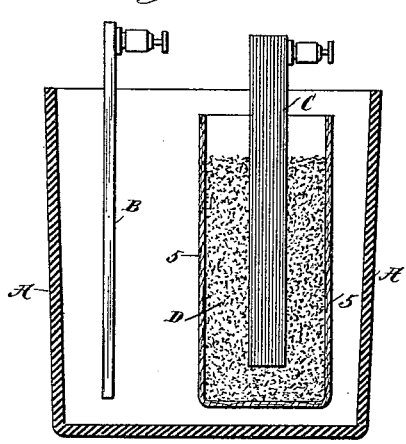
Figure 4:
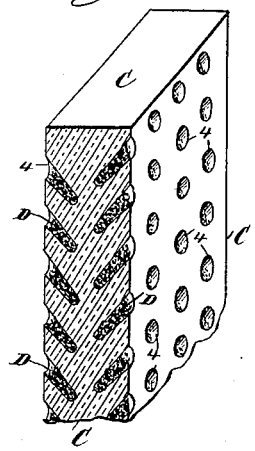
Figure 5:
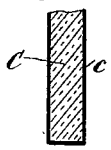

Figures 1, 2, and 3 are sectional views of cells embodying the invention in different forms. Fig. 4 is an enlarged section of the form of negative or carbon electrode shown in Fig. 2. Fig. 5 is a section of the form of negative electrode in Fig. 3.

Referring to said figures, it is to be understood that A is the cup or body of the cell; B, the positive electrode; C, the negative electrode; D, the depolarizing agent or material, and E the exciting solution. The forms and arrangements of these elements, or, in other words, the mechanical construction of the cell, which are illustrated, are purely arbitrary, and are given simply for the purpose of aiding in an understanding of the invention. The positive electrode B is of zinc, and may be of any approved form, and may be arranged horizontally, as shown in Fig. 1, or vertically, as shown in Figs. 2 and 3. The negative electrode C, which is composed of carbon, and in some cases provided with a thin plating of copper, $c$, (see Fig. 5,) over those portions which are immersed in the exciting-fluid, may also be of any suitable form, and may be arranged either horizontally or vertically. If arranged horizontally, it will preferably be in the form of a shallow dish or tray, which will serve as a receptacle for the depolarizer D, as shown in Fig. 1. If arranged vertically, it will preferably be provided with cavities, as 4, to contain the depolarizer, as shown in Figs. 2 and 4; or the negative or carbon electrode may be surrounded by a porous pot, 5, which will act to keep the depolarizer in contact with the electrode, as shown in Fig. 3, the material of the pot or casing 5 being such as to allow the exciting solution to pass and come in contact with the electrode.

The depolarizing agent or material, D, is the same as described in my prior application, before referred to, and is composed principally of hydrate of copper—that is, an alkaline hydrate—but also contains varying proportions of carbonate and oxide of copper. This depolarizing agent is neutral or passive when the battery is not doing work; but when the battery is at work the oxygen of the depolarizing agent combines with the nascent hydrogen formed on the carbon or negative electrode and the copper is reduced to a metallic condition. The action on the zinc electrode is the same as in ordinary chlorine cells. I have found, as before stated, that the depolarizing agent or material which has been described is much more efficient in its action and the life of the battery much prolonged by using it in connection with a negative electrode of carbon instead of copper, as described in my prior application.

The exciting-fluid E consists of an alkaline-chloride solution made by dissolving chloride of sodium and hydrate of soda in water. The proportions of the two salts may be varied widely without materially affecting the electrical capacity of the battery, so long as the solution contains sufficient of the hydrate of soda to render it strongly alkaline. I have found that this also greatly increases the effectiveness and vitality of the depolarizer, and this is probably due to the fact that a part of the metallic copper reduced on the carbon while the battery is in action is reconverted into the hydrate when the battery is idle by the action of the alkali in the exciting-fluid.

If it is desired to increase the energy of the battery, an alkaline nitrate, such as nitrate of ammonium or sodium, or other alkaline nitrate, may be added to the solution. This will increase the energy of the battery, but will of course shorten its life.

The depolarizing agent or material herein specified is not herein claimed, as the same is claimed in my prior application, before referred to.

What I claim is—

1. The combination, with the positive and negative electrodes, of an oxidizing-fluid containing an alkaline nitrate and a depolarizer containing an alkaline hydrate, substantially as described.

2. An exciting-fluid for galvanic batteries, consisting of an alkaline-chloride solution containing an alkaline nitrate, substantially as described.

3. The combination, with the negative and positive electrodes, of an alkaline-chloride exciting-fluid and a depolarizing agent or material containing hydrate of copper, substantially as described.

4. The combination, with a carbon electrode, of a depolarizing agent or material containing hydrate of copper, substantially as described.

5. The combination, with a carbon electrode and an alkaline-chloride exciting-fluid, of a depolarizing agent or material containing hydrate of copper, substantially as described.

In testimony whereof I have hereunto set my hand in the presence of two subscribing witnesses.

ABRAHAM V. MESEROLE.

Witnesses:
   T. H. PALMER,
   G. M. BORST.